US008107927B2

(12) United States Patent
Sivaram et al.

(10) Patent No.: US 8,107,927 B2
(45) Date of Patent: Jan. 31, 2012

(54) DEDICATED MEMORY PARTITIONS FOR USERS OF A SHARED MOBILE DEVICE

(75) Inventors: Girish Sivaram, Renton, WA (US); Ezinne Udezue, Sammamish, WA (US); Karl Warfel, Perkasie, PA (US)

(73) Assignee: T-Mobile USA, Inc., Bellevue, WA (US)

( * ) Notice: Subject to any disclaimer, the term of this patent is extended or adjusted under 35 U.S.C. 154(b) by 407 days.

(21) Appl. No.: 12/487,558

(22) Filed: Jun. 18, 2009

(65) Prior Publication Data
US 2010/0323664 A1 Dec. 23, 2010

(51) Int. Cl.
*H04B 1/38* (2006.01)

(52) U.S. Cl. ............ 455/411; 455/410; 726/17; 726/20; 711/173

(58) Field of Classification Search .................. 455/411, 455/410; 726/17, 20; 711/173
See application file for complete search history.

(56) References Cited

U.S. PATENT DOCUMENTS

| 6,950,652 | B2 | 9/2005 | Janssen et al. |
| 6,968,209 | B1 | 11/2005 | Ahlgren et al. |
| 2006/0026198 | A1 | 2/2006 | Emery et al. |
| 2006/0256734 | A1 | 11/2006 | Erhart et al. |
| 2007/0066288 | A1 | 3/2007 | Soelberg et al. |
| 2007/0254630 | A1* | 11/2007 | Moloney et al. ............ 455/410 |
| 2009/0307436 | A1* | 12/2009 | Larson et al. ............... 711/148 |

* cited by examiner

*Primary Examiner* — Phuoc Doan
(74) *Attorney, Agent, or Firm* — Perkins Coie LLP

(57) ABSTRACT

A system and method that allows a mobile device to be shared between multiple users by establishing dedicated memory partitions for each user of the mobile device is disclosed. In one embodiment, the mobile device establishes a memory partition for a user of the mobile device when the user first uses the mobile device. Users are permitted to read and/or write digital data in their respective memory partitions, and are prevented from accessing digital data in other memory partitions. In some instances, a current user of a mobile device can authorize other users to access digital data stored in the current user's memory partition. In one embodiment, a user of the mobile device can also backup and/or synchronize digital data stored in the user's memory partition using a network synchronization service.

38 Claims, 7 Drawing Sheets

DEDICATED MEMORY PARTITIONS FOR USERS OF A SHARED MOBILE DEVICE

BACKGROUND

A shared mobile device, as described herein, refers to a mobile device (e.g., a cell phone) that is used on a shared basis by multiple users. Shared mobile devices are common, for example, in pooled phone arrangements, where multiple users of an organization, group, or family share one or more mobile devices. Each user of a shared mobile device may store personal digital data (e.g., contact information, calendar entries, digital media, etc.) in the mobile device to enable fast and easy access of the digital data during his or her use of the shared mobile device. Each user of the shared mobile device stores such digital data in a storage memory of the mobile device. The digital data is commonly pooled in the storage memory and is publicly available to every user of the shared mobile device. In such a common-storage scenario, the users of the shared mobile device encounter several problems, some of which are listed here. First, a current user of the mobile device has to contend with superfluous digital data stored by other users of the shared mobile device. For example, other users of the mobile device may have entered a large number of contact entries, making it difficult for the current user to easily and quickly identify and retrieve contact information stored by the current user. Second, each user encounters privacy or confidentiality concerns in storing information in a storage memory that is openly accessible to every user of the mobile device. Third, each user would also have to contend with the risk of other users deleting or modifying their digital data. Unfortunately, this leaves users with little control over the accuracy and/or safety of their digital data when using a shared mobile device.

DETAILED DESCRIPTION

Figure 1A:
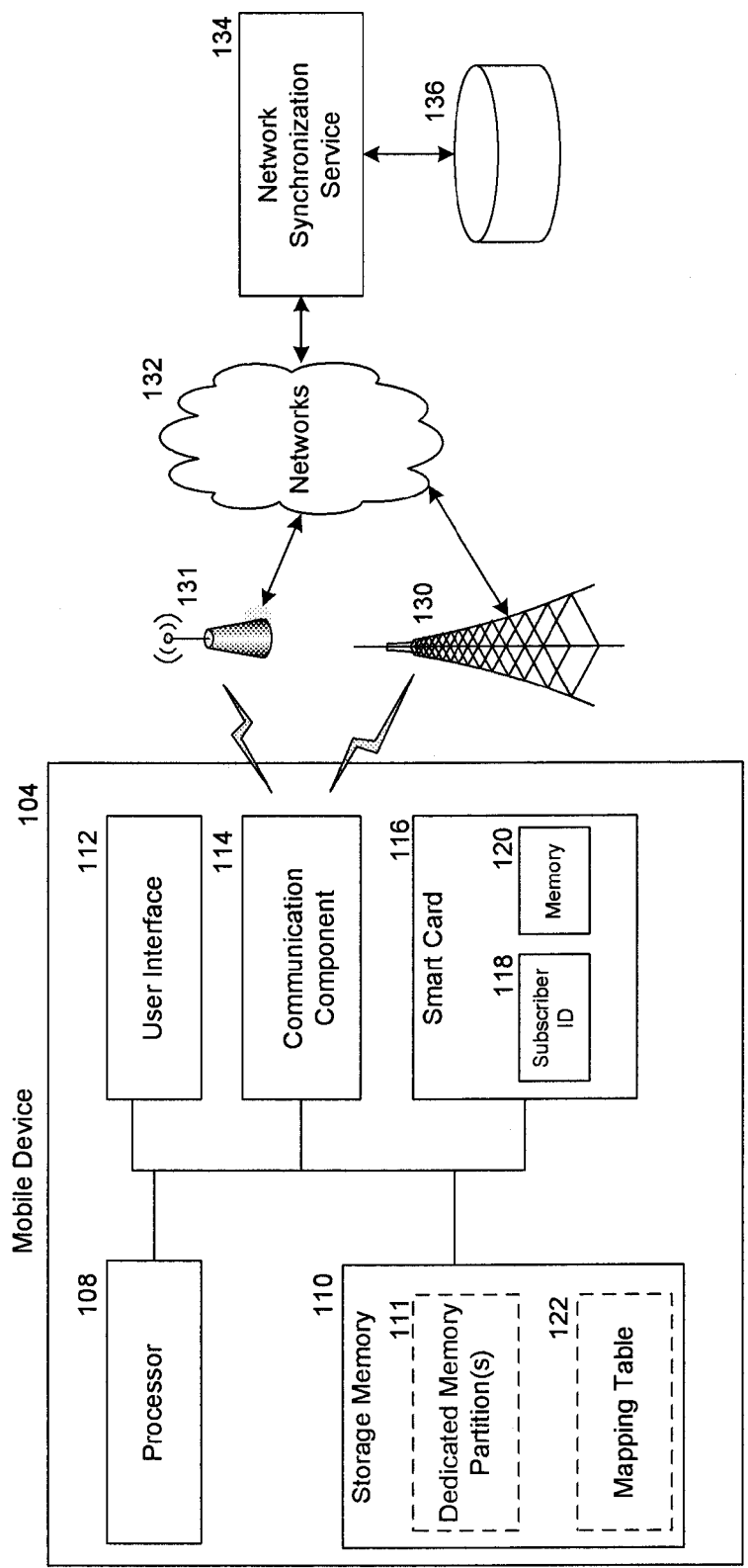
FIG. 1A is a representative environment in which a shared mobile device stores digital data corresponding to multiple users in dedicated memory partitions.

A system and method that allows a shared mobile device (or simply, "a mobile device") to establish dedicated memory partitions for each user of the device is disclosed. The mobile device may be a cell phone, a personal digital assistant (PDA), a portable email device (e.g., a Blackberry), a portable media player, or any other device having wireless communication capability.

In one embodiment, the mobile device establishes and maintains a dedicated memory partition for each user of the mobile device. Each memory partition is a subset of the available storage memory of the mobile device. In some instances, a current user of the mobile device would have access to read and/or write digital data (e.g., contact entries, task item entries, digital media files, etc.) only in the memory partition assigned to the current user. In such instances, the current user would not have access to digital data located in memory partitions assigned to other users of the mobile device.

In one embodiment, the mobile device establishes a new memory partition each time a user first uses the mobile device (i.e., when a user uses the mobile device for the first time). The first use of a mobile device by a user may occur in several ways. In some instances, the user initiates use of a mobile device by inserting a smart card (e.g., a SIM card, an ISIM card) to the mobile device and powering the mobile device on. In some instances, the user initiates use of a mobile device by powering on the mobile device and entering unique login credentials.

In one embodiment, the mobile device stores a mapping table that contains a list of entries. Each entry in the mapping table includes mapping information correlating an identifier of a user to a dedicated memory partition assigned to the user. Examples of the identifier include a smart card ID (e.g., an Integrated Circuit Card Identity), a unique login ID, etc. When a current user initiates use of the mobile device, the mobile device captures the identifier of the current user and compares it against the identifiers listed in the mapping table. If the identifier already exists in the mapping table, the mobile device identifies the current user as a preexisting user. The mobile device uses the mapping table to determine a memory partition that was previously established and assigned to the current user, and subsequently provides access to the current user to the identified memory partition. On the other hand, if the identifier does not already exist in the mapping table, the mobile device determines that the current user is a new user. The mobile device establishes a new memory partition and assigns the new memory partition for dedicated use by the current user. In either scenario, the current user would have access to read and/or write digital data in the assigned memory partition and would also be blocked from accessing digital data in any of the other memory partitions of the mobile device.

In one embodiment, the size of each memory partition is adjusted to accommodate the amount of data stored by the corresponding user. Users having more data are allocated larger memory partitions, and users having less data are allocated smaller memory partitions. As the needs of a user change, the memory partition associated with that user can grow or shrink. In one embodiment, all users receive an equal-sized memory partition that remains fixed regardless of the data use of the user.

In one embodiment, a current user of a mobile device may use an interface on the mobile device to provide permission to other users of the mobile device to access digital data stored in the memory partition assigned to the current user. In this fashion, the current user may allow contacts and other personal information to be shared with other users of the mobile device. The current user may specify the identity of the other users that can access the digital data of the current user, and may set restrictions on which portions of the current user's digital data the specified users can access.

By enabling users to store personal digital data in dedicated and restricted memory partitions, users can ensure that their digital data is not deleted or otherwise tampered with. Users are able to restrict access to their digital data, enabling the users to store private and confidential digital data in the storage memory of the mobile device. Moreover, because a current user of the mobile device is able to view only his own digital data, the current user is relieved of the hassle of parsing through superfluous digital data stored by other users to retrieve his own digital data.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention. Note that references in this specification to "an embodiment", "one embodiment", or the like, mean that the particular feature, structure or characteristic being described is included in at least one embodiment of the present invention. Occurrences of such phrases in this specification do not necessarily all refer to the same embodiment.

FIG. 1A is a representative environment in which a shared mobile device 104 stores digital data corresponding to multiple users in dedicated memory partitions. The mobile device 104 may be a cell phone, a personal digital assistant (PDA), a portable email device (e.g., a Blackberry®), a portable media player, or any other device having wireless communication capability. Wireless communication capability includes, but is not limited to, user voice and data communication capabilities in accordance with technical standards such as GSM, CDMA, TDMA, UMA/GAN, capabilities conforming to 3G standard for mobile networking, Bluetooth® technology, WiMAX, etc. It is noted that additional examples of mobile devices, as understood by people of ordinary skill in the art, are suitable for use in implementing the techniques described herein. The mobile device 104 includes a processor 108 that is configured to execute various operations of the mobile device 104.

The mobile device 104 includes a storage memory 110 to enable users of the shared mobile device 104 to store digital data. Examples of digital data include phone-book contacts, calendar entries, task-item entries, software applications (e.g., games, utility applications, etc.), notes, digital media files, SMS messages, email messages, MMS messages, etc. The storage memory includes one or more dedicated memory partitions 111. As will be explained in detail with respect to FIGS. 1B and 2A, each of the dedicated memory partitions 111 is established, for example, when a new user initiates operation of the mobile device 104. The memory partition established for a particular user is assigned for dedicated use by the particular user. Each of the dedicated memory partitions is a subset of the overall storage memory 110 of the mobile device 104. The overall storage memory may be a single storage area or multiple storage areas. For example, the storage memory may be a combination of volatile memory (e.g., RAM, SRAM, DRAM), non-volatile memory (e.g., flash memory), and hard disk storage.

Additionally, the mobile device 104 includes a user interface 112 to enable a user to interact with the mobile device 104. The user interface 112, as described herein, includes one or more components that enable a user to input information (e.g., type in numbers or letters using a keypad, make a selection using a touch-screen display, make a selection using a pointing device, etc.) and/or view information (e.g., view display on an LCD screen, view status messages displayed using LED indicators, etc.) on the mobile device 104. It is noted that additional examples of user interface components, as understood by people of ordinary skill in the art, are suitable for use in implementing the user interface described herein.

The mobile device 104 further includes a communication component 114 to enable voice and/or data communication capabilities to and from the mobile device 104. In some embodiments, the communication component 114 enables wireless voice and/or data communication with a wireless network such as a cell network 130 or a WiFi or WiMax wireless network 131. The cell network 130 or wireless network 131 are coupled through one or more public or private networks 132 to remote services. The communication component 114 enables voice and/or data communication capabilities of the mobile device 104 in accordance with technical standards such as GSM, CDMA, TDMA, UMA/GAN, capabilities conforming to 3G or 4G standard for mobile networking, Bluetooth® technology, WiMAX, etc.

In some embodiments, the mobile device 104 may include a socket or other interface to enable a user to install a smart card 116 in the mobile device 104. Examples of a smart card include a Subscriber Identity Module (SIM) card, an IP Multimedia Services Identity Module (ISIM) card, a Universal Integrated Circuit Card (UICC), etc. The smart card 116 stores a subscriber's (user's) mobile identity (e.g., the user's International Mobile Subscriber Identity (IMSI), the user's IM private user identity (IMPI), the user's IM public user identity (IMPU)), allowing the user to easily change mobile devices by simply removing the smart card 116 from one mobile device and inserting the smart card 116 into another mobile device. In some instances, the smart card 116 is an integrated circuit card, having a unique Integrated Circuit Card Identity (ICCID). The smart card 116 also includes a memory component 120 to store, for example, the IMSI, IMPI, IMPU, and/or ICCID. In some instances, the memory component 120 of the smart card 116 may also be used to store, for example, contacts entered by the user of the mobile device in which the smart card is installed.

In one embodiment, the mobile device 104 includes a mapping table 122. Each entry of the mapping table correlates a particular user of the mobile device 104 to a corresponding memory partition established and assigned for use by the particular user. In some instances, the mapping table utilizes an identifier associated with each user to map the user to the corresponding memory partition. The identifier may be, for example, the IMSI stored in the smart card 116, the ICCID stored in the smart card 116, the UICC stored in the smart card, etc. The mapping table 122 is stored, for example, in the storage memory 110 of the mobile device, or may be stored in any other storage medium attached to the mobile device. While the term "table" is used to describe the data structure that associates each user with a memory partition, it will be appreciated that any data structure may be used that is able to maintain a correspondence between users and memory partitions, such as lists, pointer arrays, etc.

In some embodiments, the mobile device 104 communicates with a network synchronization service 134 to synchronize, for example, digital data stored in the storage memory 110 of the mobile device. In some instances, the network synchronization service 134 communicates with the mobile device through networks 132. The networks 132 may be the Internet, a private network, a public network, or a combination of any of the foregoing. The network synchronization service 134 is connected to a storage medium 136 to store the digital data received from the mobile device 104. In some instances, the storage medium 136 may include dedicated storage partitions correlating to the dedicated memory partitions 111 of the mobile device 104. In such instances, the digital data stored in a particular memory partition of the mobile device 104 is synchronized with digital data stored in a corresponding storage partition of the storage medium 136. To perform the synchronization, the mobile device 104 transmits digital data using the communication component 114. The communication component 114 transmits the data to the network 132 using the cell network 130 or the wireless network 131. The network synchronization service receives the digital data and stores the digital data in the storage medium 136. In some instances, the mobile device 104 may directly communicate with the networks 132 to establish a data communication channel with the network synchronization service 134, such as when the mobile device is coupled to a computer for synchronization purposes.

The previous discussion provided a brief, general description of a suitable environment in which the techniques described herein can be implemented. Although not required, aspects of the invention are described herein in the general context of computer-executable instructions, such as routines executed by a general-purpose data processing device. Those skilled in the relevant art will appreciate that the invention can be practiced with other communications, data processing, or computer system configurations, including: Internet appliances, hand-held devices (including personal digital assistants (PDAs) and digital music players), all manner of mobile phones, multi-processor systems, microprocessor-based or programmable consumer electronics, set-top boxes, network PCs, mini-computers, mainframe computers, and the like. Aspects of the invention may be stored or distributed on computer-readable media, including magnetically or optically readable computer discs, hard-wired or preprogrammed chips (e.g., EEPROM semiconductor chips), or other data storage media. While aspects of the invention, such as certain functions, are described as being performed exclusively on a single device, the invention can also be practiced in distributed environments where functions or modules are shared among disparate processing devices, which are linked through a communications network, such as a Local Area Network (LAN), Wide Area Network (WAN), ISUP, SS7, or the Internet. In a distributed computing environment, program modules may be located in both local and remote memory storage devices.

Figure 1B:
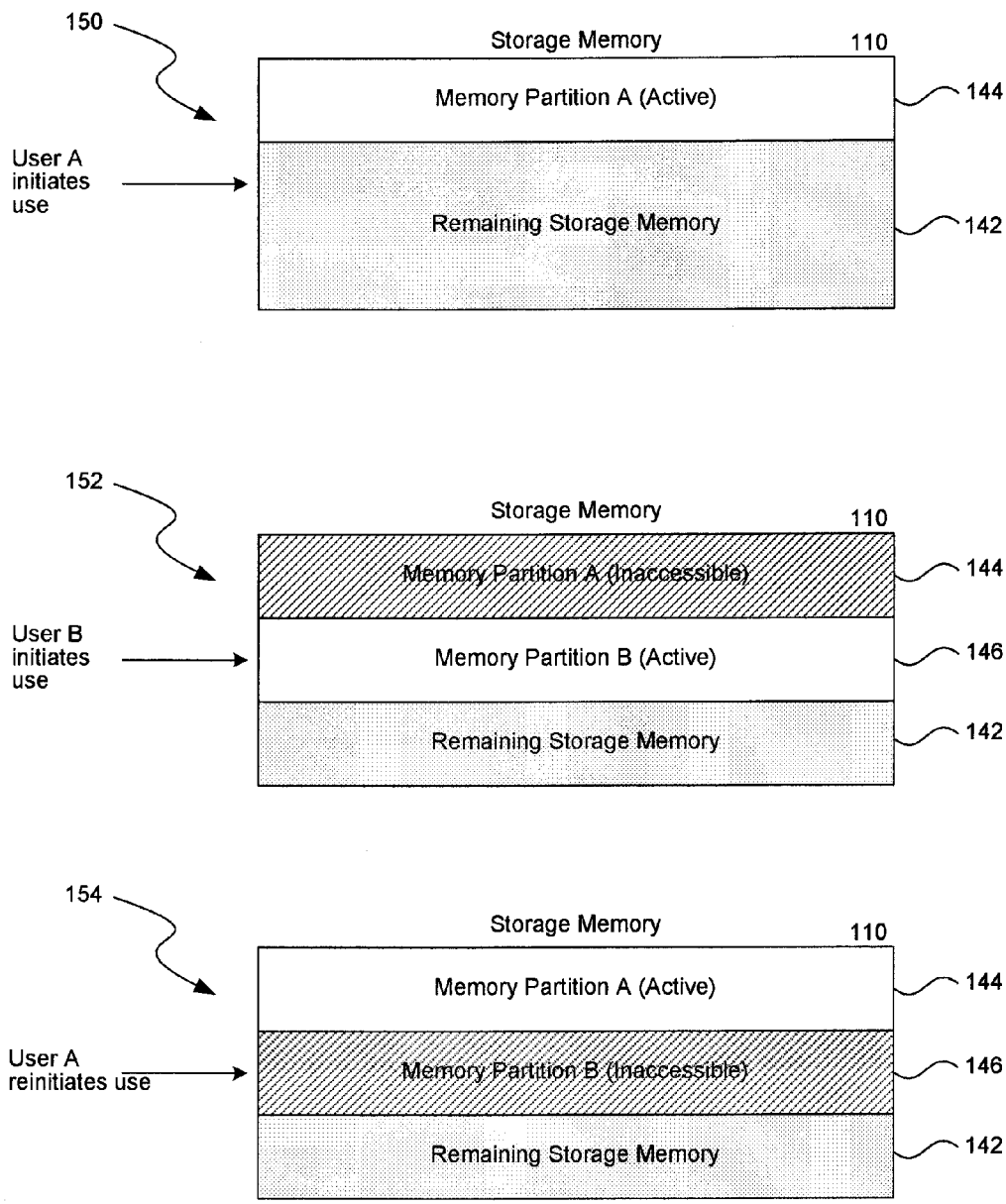
FIG. 1B depicts an exemplary allocation of memory partitions in the storage memory of a shared mobile device.

FIG. 1B depicts an exemplary allocation of memory partitions in the storage memory 110 of a shared mobile device 104. In a first scenario 150, a first user (user A) uses the mobile device 104. A user may initiate use of a mobile device in one of several ways. In some instances, for example, a user may initiate use by inserting a smart card into the mobile device and powering on the mobile device. The first time that a smart card is inserted into the mobile device (i.e, if the smart card has not been previously used in conjunction with the mobile device), the mobile device 104 uses an identifier stored in the smart card (e.g., an IMSI stored on the smart card) as an identifier of the user. The smart card may or may not have been used with other mobile devices and may or may not have digital data (e.g., contacts) stored in it.

Figure 1C:
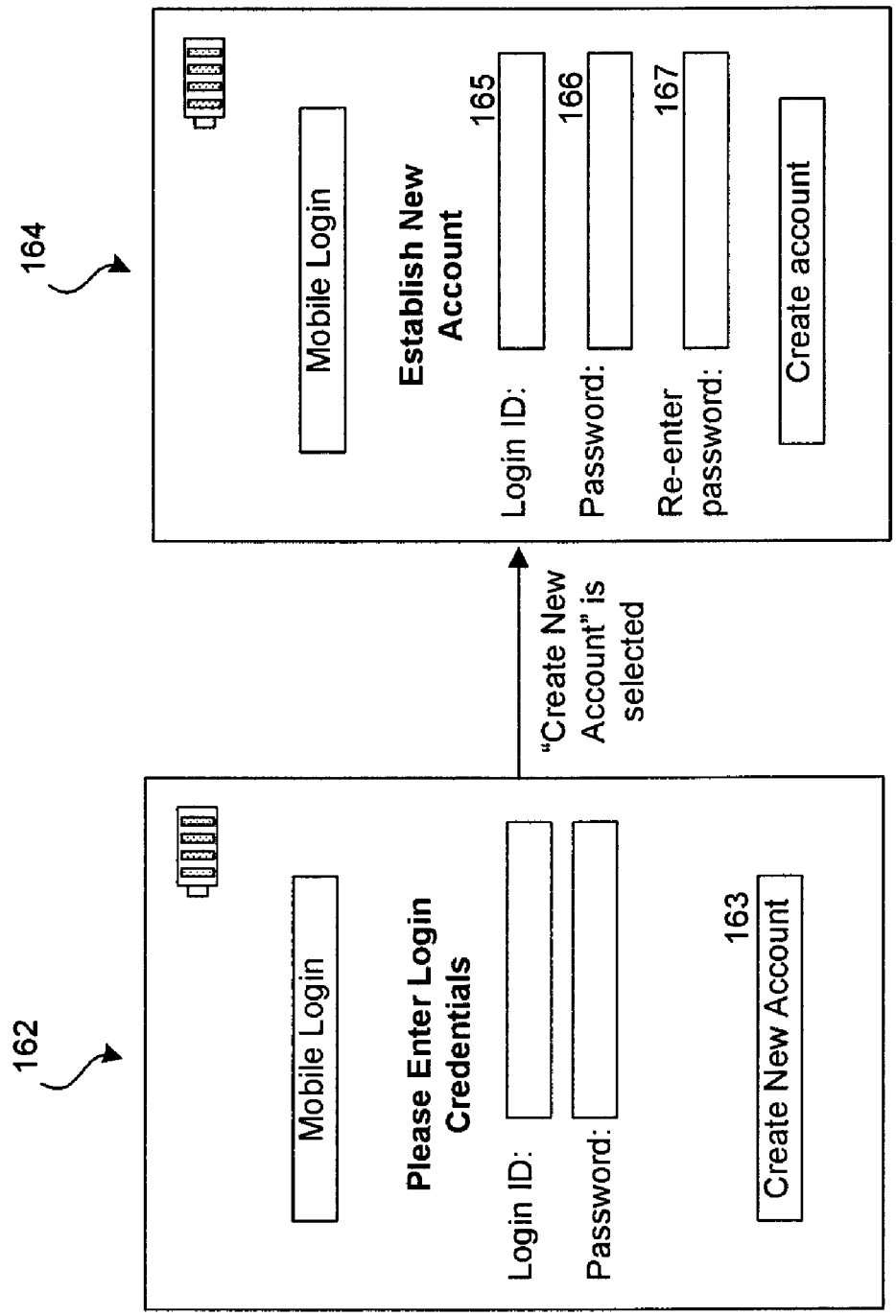
FIG. 1C includes sample screenshots of a user interface of the mobile device that allows a user to establish a new login account.

In other instances, a user may initiate use of the mobile device 104 by powering on the mobile device and then, for example, entering credentials to login to the mobile device. In such instances, the mobile device 104 may be configured to display a login page when it is powered on. The credentials provided by the user may be, for example, a combination of a login ID and a password that the user needs to enter to gain access to services of the mobile device 104. To initiate a first use of the shared mobile device 104, the user may use the user interface 112 of the mobile device to enter data necessary to establish a new login account. FIG. 1C includes sample screenshots of a login interface generated by the mobile device that allows a user to establish a new login account. Upon powering on, the mobile device 104 displays a login page 162 to allow a user to enter a Login ID and password to login to the mobile device 104. The login page 162 also includes a "create new account" button 163 that allows a user to establish a new account. When a user selects the new account button 163, a new account setup page 164 is displayed to the user. On the new account setup page, the user may specify login credentials, such as a login ID 165, a password 166, confirmation of the password 167, etc., to establish a new login account. The user may then return to the login page 162 to enter the credentials and initiate a first use of the mobile device 104. When login credentials are used to identify a user, the mobile device 104 uses the login ID of the user as an identifier of the user.

It will be appreciated that other techniques exist which allow a user to operate a mobile device based on a unique identifier. For example, a user may be allowed to use a mobile device based on a scanned identification card (e.g., a credit card). As another example, a user may be allowed to use a mobile device based on an RFID token in the user's possession. Such other techniques for receiving a unique identifier from a user are suitable for implementing the method and system described herein.

Returning to FIG. 1B, user A initiates use of the mobile device 104 in the first scenario 150. Upon detecting use, the mobile device 104 determines whether an identifier associated with the user already exists in the mapping table 122. If the identifier does not exist in the mapping table, the mobile device 104 assumes that the user is a new user. In such a scenario (i.e., upon first use by a new user (user A)), a new memory partition 144 (memory partition A) is established in the storage memory 110 of the mobile device. Memory partition A, which is a subset of the storage memory 110, becomes the active partition of the storage memory 110. The term "active" indicates that memory partition A is assigned for read and/or write operations by user A, and that the remaining storage memory 142 remains inaccessible to user A. Upon establishing memory partition A, the mobile device 104 records a new entry in mapping table 122 to correlate the identifier (e.g., smart card ID, login ID) of user A to memory partition A.

The size of memory partition A is dynamically adjusted, meaning that the amount of memory (i.e., the size of the storage space) allocated to memory partition A is variable based on the amount of memory needed to store user A's digital data. In an illustrative example, as soon as memory partition A is established, the mobile device 104 may copy contacts from the memory 140 of user A's smart card 116 to memory partition A. In such an example, memory partition A is initially established with a storage size that is sufficient to store the contacts copied from the smart card 116. The storage size of memory partition A is allowed to increase as and when user A stores additional digital data to memory partition A. In some instances, the size of memory partition A is limited only by the overall storage size of the storage memory 110 of the mobile device 104.

When the aggregate size of the memory partitions begin to reach the overall storage size of the storage memory 110, the mobile device 104 prompts users of the mobile device to delete digital data from the storage memory in order to create room for new data. For example, a user may be prompted to delete certain data in a first-in first-out (FIFO) fashion. As another example, a user may be prompted to delete certain data based on length of time since last access. If a memory partition associated with a particular user is significantly larger than the memory partitions associated with other users, the mobile device may request that the particular user delete digital data from the storage memory. The mobile device may also impose a storage cap on the particular user, artificially limiting the size of the memory partition associated with the user in order to preserve storage space for other users.

In a second scenario 152, user A stops using the mobile device 104 and user B (a new user) initiates use of the mobile device 104. User B may initiate use using any of the techniques discussed above. In the second scenario 152, upon detecting that user B is a new user, the mobile device establishes a new memory partition 146 (memory partition B) having a storage size that is dynamically adjusted, meaning that the size of the memory partition changes over time to meet the storage requirements of the user. The mobile device 104 records a new entry in mapping table 122 to correlate the identifier of user B to memory partition B. User B is provided read and/or write access to memory partition B. Additionally, user B is blocked from accessing the other memory partitions (e.g., memory partition A) of the storage memory 110.

In a third scenario 154, user B stops using the mobile device 104 and user A (the user from the first scenario 150) reinitiates use of the mobile device 104. In the third scenario, the mobile device 104 looks up the identifier of user A in the mapping table 122 and determines that user A is a preexisting user. Since user A is a preexisting user with an allocated memory partition, the mobile device 104 grants user A access to memory partition A. Additionally, user A is blocked from accessing the other memory partitions of the storage memory 110.

While only two users (A and B) are shown as accessing the memory of the mobile device in FIG. 1B, it will be appreciated that any number of users may share the mobile device and be assigned a memory partition. Even though the system may manage memory partitions assigned to any number of users, it has been found that in practice the average number of users that typically share a mobile device is no more than three or four. As a result, the size of each memory partition may be quite large since only a small number of users typically share a device.

Figure 2A:
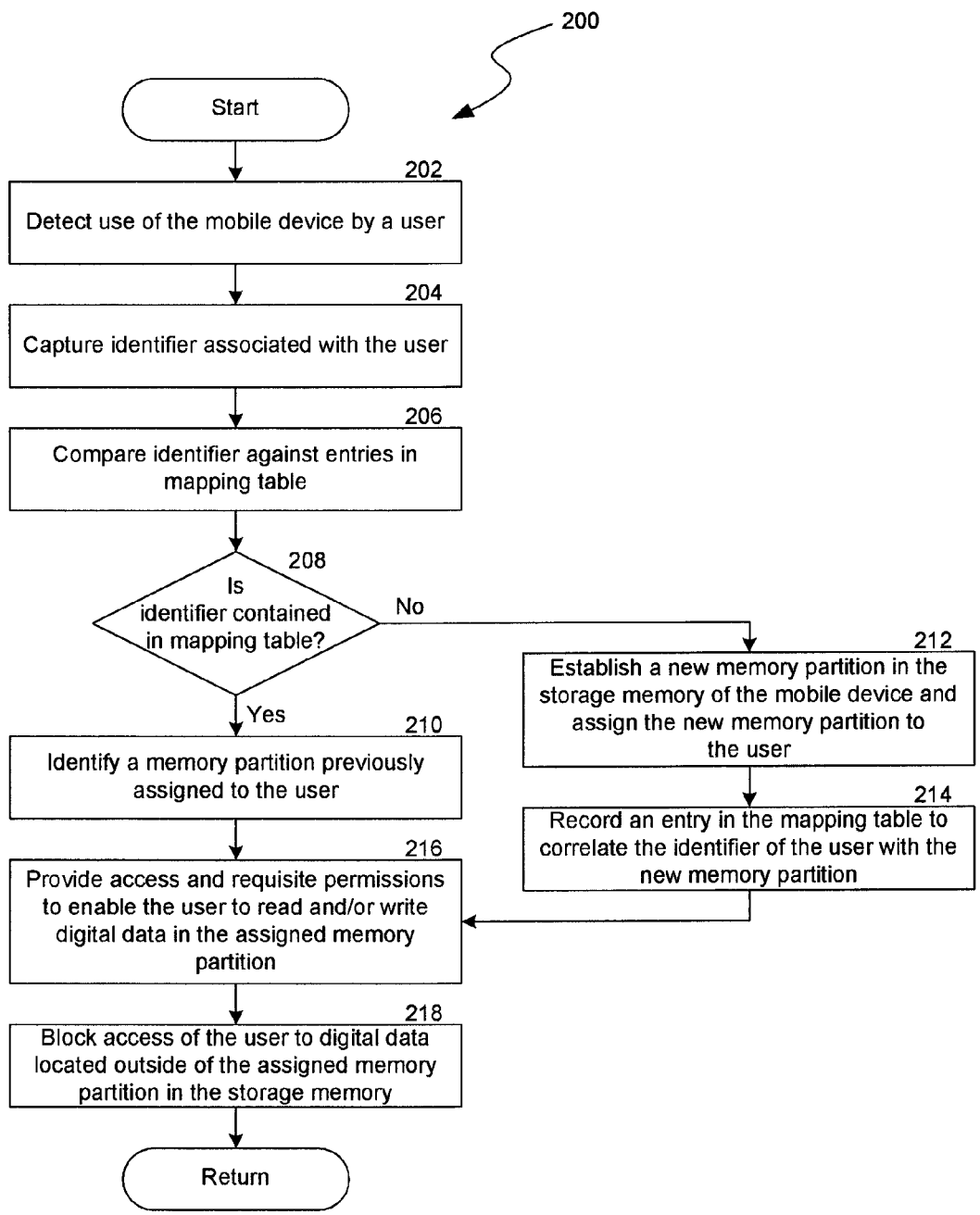
FIG. 2A is a flow diagram of a process used to allocate and manage dedicated memory partitions to users of a shared mobile device.

FIG. 2A is a flow diagram of a process 200 used to allocate and manage dedicated memory partitions to users of a shared mobile device. At block 202, the mobile device detects use by a user of the mobile device. As discussed above, a user may initiate use, for example, by inserting a smart card into the mobile device and powering on the mobile device, or by powering on the mobile device and entering login credentials to login to the mobile device. At block 204, the mobile device captures an identifier associated with the user. The identifier may be, for example, a smart card ID (e.g., an IMSI stored in the smart card), a login ID entered by the user, or other unique identifier.

At block 206, the mobile device compares the captured identifier against entries stored in a mapping table. The mapping table includes an entry for every user that has previously used the mobile device. Each entry includes, for example, the identifier of a particular user and a corresponding memory partition that the particular user has been assigned to. At block 208, the mobile device determines whether an entry already exists for the captured identifier of the user.

If the mobile device determines that such an entry does not already exist for the user (i.e., because the user has not previously used the mobile device), processing proceeds to block 212. At block 212, the mobile device establishes a new memory partition in the storage memory and assigns the new memory partition for dedicated use by the user. Subsequently, at block 214, the mobile device records a new entry in the mapping table to correlate the identifier of the user to the newly established memory partition. Processing then proceeds to block 216, where the mobile device allocates requisite access permissions to enable the user to read and/or write digital data in the assigned memory partition.

On the other hand, if the mobile device determines at block 208 that the identifier associated with the user already exists in the mapping table (i.e., because the user has previously uses the mobile device), processing proceeds to block 210. At block 210, the mobile device looks up the entry in the mapping table associated with the identifier of the user and identifies the memory partition that was previously assigned to the user. At block 216, the mobile device allocates requisite access permissions to enable the user to read and/or write digital data in the previously-assigned memory partition.

Subsequent to providing access to the user to the assigned memory partition, processing proceeds to block 218, where the mobile device blocks access of the user to digital data located outside of the assigned memory partition. As discussed above, in some instances, the storage memory of the mobile device may have multiple memory partitions. In such instances, each memory partition is assigned to a particular user of the shared mobile device. Therefore, at block 218, the mobile device blocks access of the user to digital data that may be located in any of the other memory partitions. The system may block access by not permitting users to access memory partitions that they are not associated with. The system may also further restrict access by encrypting the memory partitions using, for example, a user's identifier as an encryption key. By encrypting the memory partitions, even if a user were to breach access controls that are maintained by the system, the user would be unable to access stored data associated with other users without further breaking the applied encryption.

Figure 2B:
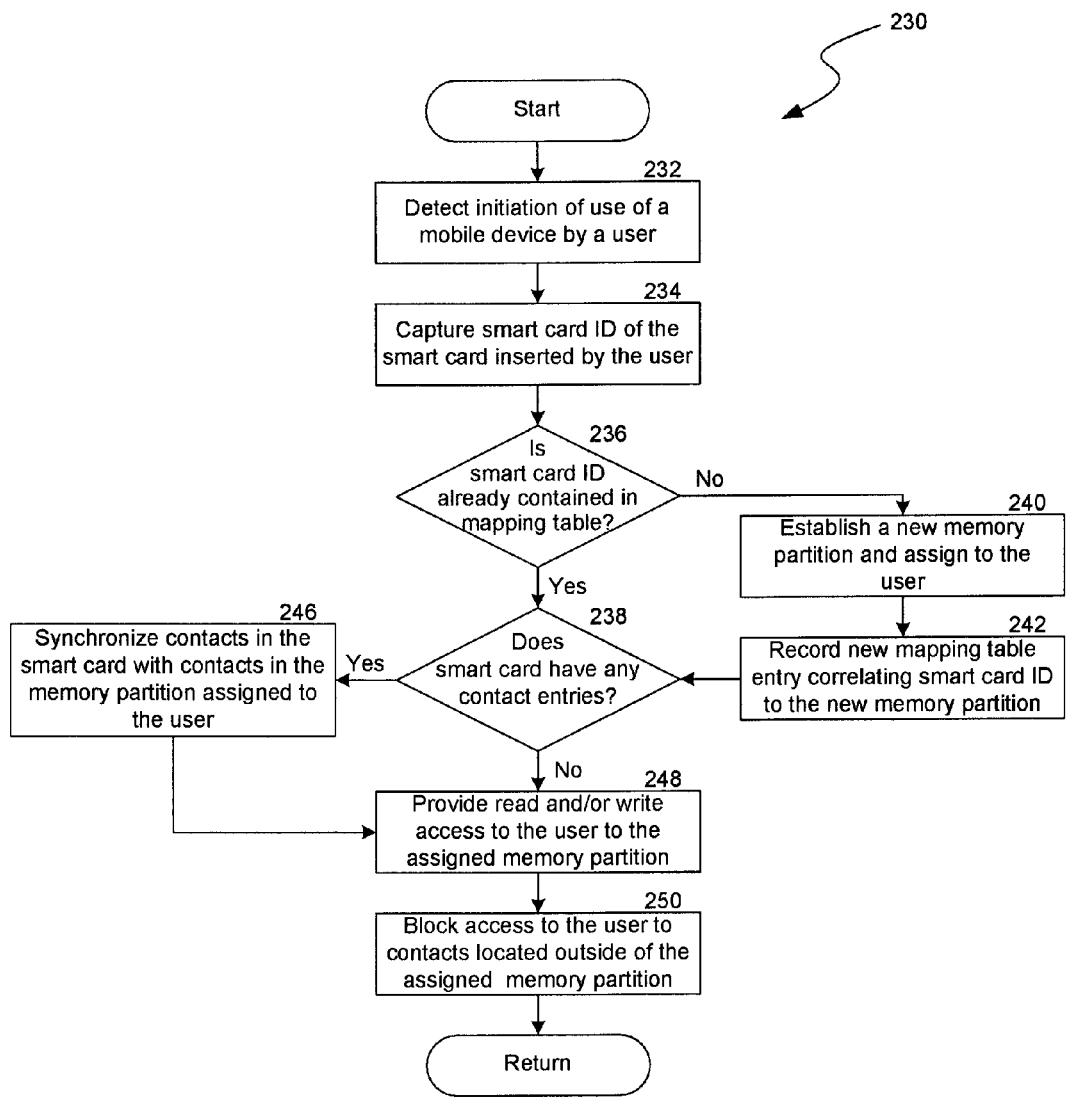
FIG. 2B is a flow diagram of a process for storing and managing phone-book contacts in dedicated memory partitions of a shared mobile device.

FIG. 2B is a flow diagram of a process 230 for storing and managing phone-book contacts in dedicated memory partitions of a shared mobile device. Process 230, as described herein, applies to an embodiment where a user initiates use of the mobile device by inserting a smart card and powering on the mobile device. Additionally, process 230 is described in the context of storing and managing phone-book contacts ("contact entries") in the mobile device. It is understood that the techniques discussed in reference to process 230 can apply to other digital information (e.g., SMS messages, MMS messages, email messages, notes, music, pictures, etc.) as well.

At block 232, the mobile device detects use of the mobile device. As discussed above, such a detection of use occurs when a user inserts a smart card and powers on the mobile device. At block 234, the mobile device captures a smart card ID that is stored in the smart card. The smart card ID is used as an identifier of the user. Examples of a smart card ID include IMSI, ICCID, etc.

At block 236, the mobile device determines whether the identifier (i.e., the smart card ID) already exists in an entry of the mapping table. If the smart card ID does not exist in the mapping table, the mobile device infers that the user is a new user, and processing proceeds to block 240. At block 240, the mobile device establishes a new memory partition in the storage memory of the mobile device, and assigns the new memory partition for dedicated use by the user. Subsequently, at block 242, the mobile device records a new entry in the mapping table, correlating the identifier and the new memory partition assigned to the user. Processing then continues to block 238. If, however, the smart card ID exists in the mapping table at block 236, processing continues directly to block 238.

At block 238, the mobile device determines whether the smart card contains any stored contact entries. If the mobile device determines that the smart card contains stored contact entries, processing proceeds to block 246. At block 246, the mobile device synchronizes the contact entries stored in the smart card with any contact entries that are stored in the assigned memory partition. In some instances, the mobile device may query the user whether the contact entries should be synchronized and only synchronize the contact entries after receiving an affirmative response from the user. For example, the mobile device may display two contact entries to the user and highlight any discrepancies between the two contact entries. The user is then allowed to select one contact entry over the other contact entity, or highlight fields from each contact entry that should be merged as a definitive contact entity. Since smart cards typically have limited capability to store large amounts of data associated with a contact entity, as part of the reconciliation process the system may maintain a mapping of multiple contact entries in a smart card (e.g., a friend's mobile number, a friend's work number, and a friend's home number) with a single contact entry contained in the memory partition on the mobile device. In other instances, the mobile device may automatically perform the synchronization when contact entries are detected in the smart card.

Processing then proceeds to block 248, where the mobile device provides the user read and/or write access to the assigned memory partition. The user may then add, delete, or modify contact entries in the assigned memory partition. At block 250, the mobile device blocks the user's access to contact entries that may be located in any other memory partition of the storage memory of the mobile device. In some instances, the mobile device may continue to automatically synchronize the contact entries of the assigned memory partition with the contact entries of the smart card as and when the user makes changes to the contact entries in the assigned memory partition.

Figure 3A:
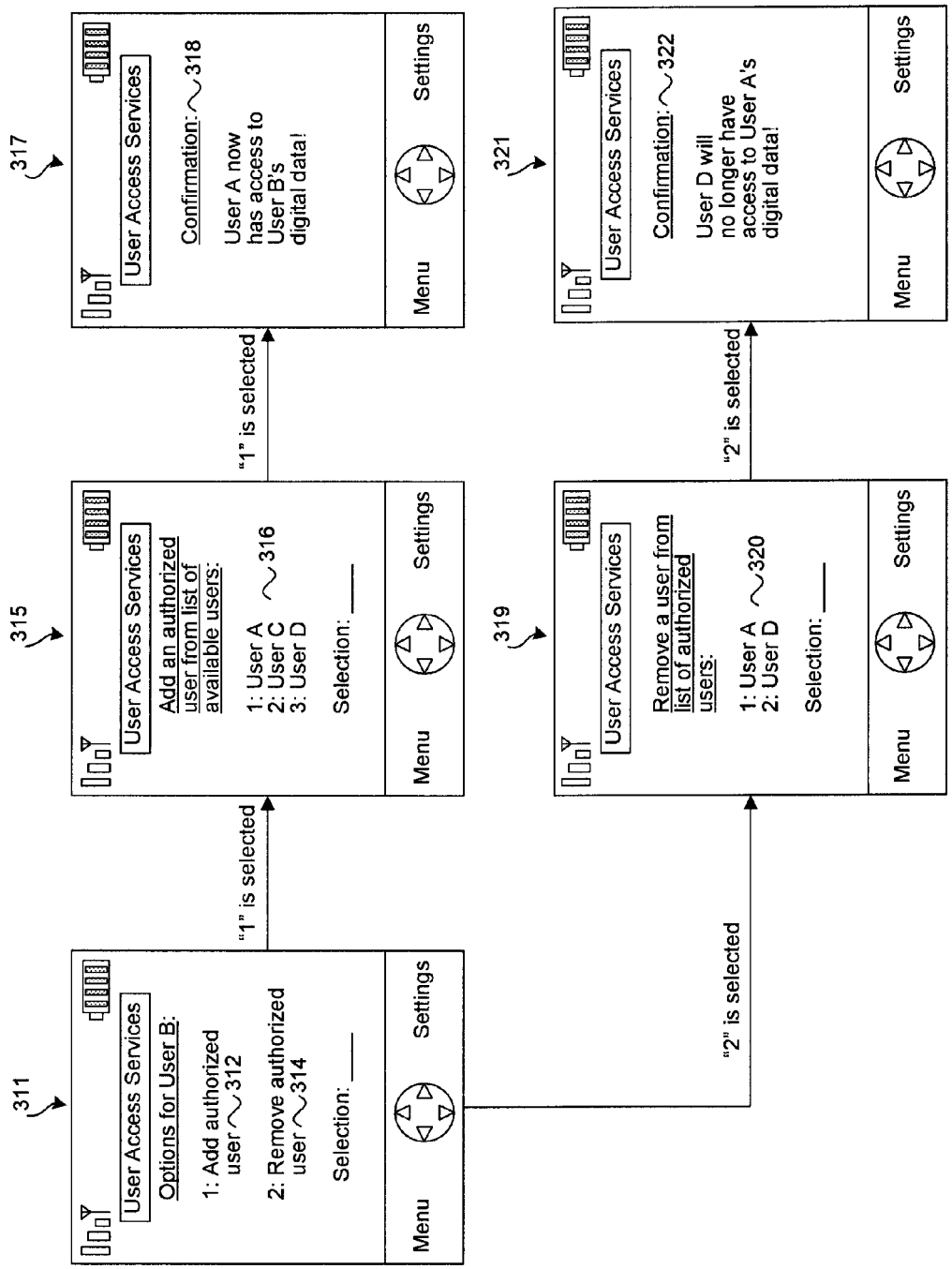
FIG. 3A depicts a set of representative screenshots of the user interface of the mobile device which enables a current user to authorize other users to access the current user's digital data.

In one embodiment, a particular user of the shared mobile device may grant access to enable other users of the mobile device to read and/or write data in the memory partition assigned to the particular user. FIG. 3A depicts a set of representative screenshots of a user interface of the mobile device 104 which enable a current user to authorize other users to access the current user's memory partition. In a first screen 311, user B is provided a form titled "User Access Services" with a first option 312 for user B to add an authorized user and a second option 314 for user B to remove an authorized user. Using the "add an authorized user" option 312, user B may authorize another user to access digital data located in the memory partition assigned to user B. Using the "remove an authorized user" option 314, user B may block a previously-authorized user from accessing digital data located in the memory partition assigned to user B.

When a user elects to authorize another user, the user interface presents a second screen 315. The user interface provides a list of current users 316 of the shared mobile device 104 and prompts the user to select one or more of the users from the displayed list. In the depicted example, user B selects "1", i.e., user B indicates that user A should be allowed access to the digital data stored in the memory partition assigned to user B. The user interface then displays a third screen 317 to display a confirmation message 318 indicating that user A has been granted access to digital data located in the memory partition assigned to user B. To allow the granted access, the mobile device 104 makes suitable changes to the mapping table 122 to map user A's identifier to both memory partitions (i.e., to map user A to both user A's memory partition and user B's memory partition). In such a scenario, user A will have access to memory partitions assigned both to user A and user B the next time that user A uses the mobile device 104. Although not depicted in the user interface, when granting access to an authorized user, a user may specify certain access rules associated with the authorized user. For example, a user may specify that the authorized user receives read access to data in the memory partition, but not modify or delete access to data that is contained in the memory partition. As another example, a user may specify that the authorized user may have modify or delete access to data contained in the memory partition, but that any modifications or deletions made by the authorized user must be confirmed by the user before they are made permanent.

The user interface depicted in the first screen 311 also provides an option 314 to enable user B to remove an authorized user. When user B chooses to remove an authorized user, the user interface displays a fourth screen 319. In the fourth screen, the user interface provides a list of users 320 that currently have access to the memory partition assigned to user B. In the depicted example, user B selects "2," indicating that user B would like to remove user D from the list of authorized users. Subsequently, the mobile device makes suitable changes to alter the entry corresponding to user D in the mapping table 122 and remove user D's access to user B's memory partition. The user interface then displays a fifth screen 321 providing a confirmation message 322 that user D has been removed from the list of authorized users 320.

As an alternative to the user interface described in FIG. 3A, an interface (not shown) may be presented to a user that allows the user to assign a password to their corresponding memory partition. The user may distribute the password to other users that they would like to authorize to read and/or write data in the memory partition assigned to the user. When using the mobile device, other users that have received the password are able to enter the password and access the providing user's stored data. By selectively distributing the password, a user can easily determine who receives access to their personal data without having to manage a list of authorized users via the mobile device. In the event that the user decides to revoke access to other users, the user simply changes the password associated with the memory partition.

Figure 3B:
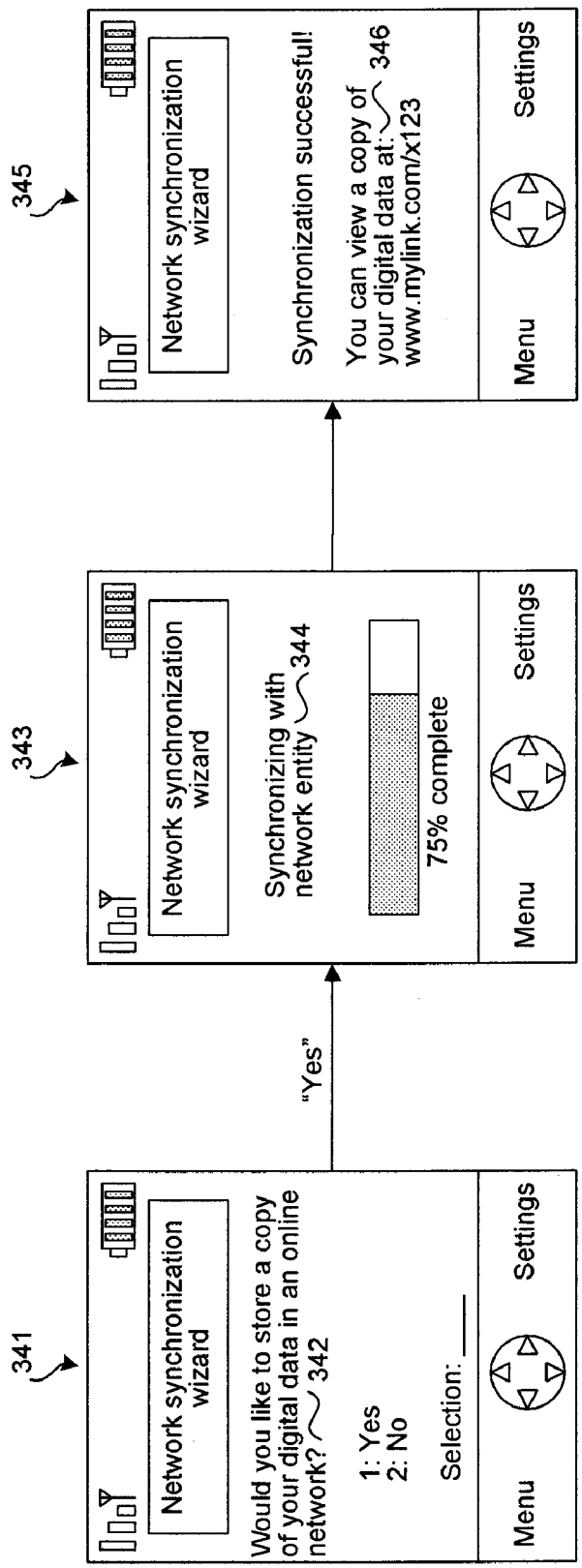
FIG. 3B depicts a set of representative screenshots of the user interface of the mobile device which allows a current user to backup and/or synchronize the digital data stored in the memory partition assigned to the current user.

In one embodiment, the mobile device 104 enables a user of the mobile device 104 to backup and/or synchronize data stored in the memory partition assigned to the user. FIG. 3B depicts a set of representative screenshots of a user interface of the mobile device 104 which allows a user to backup and/or synchronize the digital data that is contained in the user's memory partition. The data is backed-up and/or synchronized to the storage medium 136 associated with the network synchronization service 134. In some instances, the storage medium 136 includes a set of network memory partitions. In such instances, each network memory partition corresponds to a memory partition of the storage memory 110 of the mobile device 104. Digital data stored in the memory partition assigned to the user is backed-up and/or synchronized in a unique network memory partition of the storage medium 136. It is understood that in lieu of or in addition to the network memory partitions, the storage medium 136 may also utilize other mechanisms (e.g., tags to associate the stored data with the identifier of the current user, etc.) to categorize and store the data.

A first screen 341 of FIG. 3B depicts an option 342 to enable a current user to initiate network backup and/or synchronization of digital data stored in a memory partition assigned to the current user. After the user indicates that he would like to initiate backup and/or synchronization, the user interface presents a second screen 343. The second screen 342 displays a status indicator 344 to provide a visual status update of the backup and/or synchronization process. After the backup and/or synchronization process is complete, the user interface presents a confirmation message 346 as depicted in a third screen 345.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), etc. Software or firmware to implement the techniques introduced here may be stored on a machine-readable medium and may be executed by one or more general-purpose or special-purpose programmable microprocessors. A "machine-readable medium," as the term is used herein, includes any mechanism that stores information in a form accessible by a machine (e.g., a computer, network device, personal digital assistant (PDA), any device with a set of one or more processors, etc.). For example, a machine-accessible medium includes recordable/non-recordable media (e.g., read-only memory (ROM), random access memory (RAM); magnetic disk storage media, optical storage media, flash memory devices, etc.).

Although the present invention has been described with reference to specific exemplary embodiments, it will be recognized that the invention is not limited to the embodiments described, but can be practiced with modification and alteration within the scope of the appended claims. Accordingly, the specification and drawings are to be regarded in an illustrative sense rather than a restrictive sense.

We claim:

1. A method of sharing resources of a single mobile device among a plurality of users, the method comprising:
   for each of a plurality of users of a single mobile device:
      detecting an identifier associated with each user;
      establishing a memory partition in a storage memory of the mobile device and associating the memory partition with the detected identifier of each user, wherein the memory partition is a subset of the available storage memory in the mobile device; and
      storing digital data associated with each user in the associated memory partition;
   allowing access of a user of the mobile device to digital data stored in the memory partition associated with the user; and
   denying access of a user of the mobile device to digital data stored in memory partitions that are not associated with the user.

2. The method of claim 1, wherein the size of a memory partition is dynamically adjusted to store the digital data of the associated user.

3. The method of claim 1, wherein the size of a memory partition is fixed.

4. The method of claim 1, wherein the identifier associated with a user is a credential received from the user during an account login.

5. The method of claim 1, wherein the identifier associated with a user is an identifier received from a smart card inserted into the mobile device by the user.

6. The method of claim 5, wherein the identifier is an International Mobile Subscriber Identity (IMSI), IM Public User identity (IMPU), or IM Private User identity (IMPI).

7. The method of claim 5, wherein the identifier is an Integrated Circuit Card ID (ICCID).

8. The method of claim 1, wherein the association between the memory partition and the identifier of the user is stored in a mapping table.

9. The method of claim 1, further comprising:
   allowing one user to authorize another user to access digital data associated with the one user.

10. The method of claim 9, further comprising:
    allowing the one user to specify access rules that are associated with the authorized another user.

11. The method of claim 1, further comprising:
    prompting a user of the mobile device to delete digital data from a memory partition assigned to the user if the storage memory of the mobile device approaches a threshold capacity.

12. The method of claim 11, wherein the user is prompted to delete the oldest digital data contained in the memory partition.

13. The method of claim 11, wherein the user is prompted to delete the least-accessed digital data contained in the memory partition.

14. The method of claim 1, further comprising:
    enabling a user to synchronize the digital data stored in the associated memory partition with a network storage service.

15. The method of claim 1, wherein the digital data associated with a user includes one or more of:
    a contact list;
    a calendar;
    a task list;
    a note;
    a digital media file;
    a message; or
    a software application.

16. The method of claim 15, further comprising:
    enabling a user to synchronize a contact list in the associated memory partition with a contact list in a smart card associated with the user.

17. A method of sharing resources of a mobile device among a plurality of users, the method comprising:
    establishing a plurality of memory partitions in a storage memory of a shared mobile device, each memory partition being associated with one of a plurality of users of the shared mobile device, wherein each memory partition is a subset of the storage memory of the shared mobile device;
    maintaining a mapping of the plurality of users to the plurality of memory partitions; and
    using the mapping of the plurality of users to the plurality of memory partitions to:
       allow access to a user to read or write digital data in the memory partition that is associated with the user; and
       deny access to a user to read or write digital data stored outside of the memory partition that is associated with the user.

18. The method of claim 17, wherein a memory partition is established for a user when the user provides log-in credentials to the shared mobile device.

19. The method of claim 17, wherein a memory partition is established for a user when the user connects an unrecognized smart card to the shared mobile device.

20. The method of claim 17, further comprising:
enabling a first user of the shared mobile device to authorize a second user of the shared mobile device to access digital data associated with the first user; and
providing, to the second user, access to the digital data associated with the first user subsequent to the first user granting the authorization to the second user.

21. The method of claim 20, further comprising:
allowing the first user to specify access rules that govern the ability of the second user to access the digital data associated with the first user.

22. The mobile device of claim 17, wherein each user is identified in the mapping by one of:
login credentials associated with the user;
an IMSI associated with a smart card of the user;
an ICCID associated with a smart card of the user;
an IM Public User identity associated with a smart card of the user; or
an IP Private User identity associated with a smart card of the user.

23. A method of sharing memory resources of a mobile device among a plurality of users, the method comprising:
recognizing a first user of a plurality of shared users of a mobile device based on an identifier associated with the first user;
identifying a first memory partition of a storage memory of the mobile device previously assigned for dedicated use by the first user, wherein the first memory partition is a subset of a storage memory in the mobile device;
presenting to the first user a list of the plurality of shared users of the mobile device;
receiving from the first user a selection of one or more authorized users from the presented list of shared users;
allowing the selected one or more authorized users to read or write digital data in the first memory partition; and
denying access to the first memory partition to shared users that were not selected by the first user to prevent the non-selected shared users from accessing digital data located in the first memory partition.

24. The method of claim 23, wherein the identifier is login credentials associated with the first user.

25. The method of claim 23, wherein the identifier is an International Mobile Subscriber Identity (IMSI), IM Public User identity (IMPU), or IM Private User identity (IMPI) associated with a smart card of the first user.

26. The method of claim 23, wherein the identifier is an Integrated Circuit Card ID (ICCID) associated with a smart card of the first user.

27. A method of sharing memory resources of a mobile device among a plurality of users, the method comprising:
recognizing a first user of a plurality of shared users of a mobile device based on an identifier associated with the first user;
identifying a first memory partition of a storage memory of the mobile device previously assigned for dedicated use by the first user, wherein the first memory partition is a subset of a storage memory in the mobile device;
allowing the first user to associate a password with the first memory partition, wherein the password may be shared by the first user with one or more other users;
allowing other users to read or write digital data in the first memory partition if the other users provide the associated password; and
denying access to the first memory partition to other users that do not provide the associated password.

28. The method of claim 27, wherein the identifier is login credentials associated with the first user.

29. The method of claim 27, wherein the identifier is an International Mobile Subscriber Identity (IMSI), IM Public User identity (IMPU), or IM Private User identity (IMPI) associated with a smart card of the first user.

30. The method of claim 27, wherein the identifier is an Integrated Circuit Card ID (ICCID) associated with a smart card of the first user.

31. A mobile device configured to be shared between a plurality of users, the mobile device comprising:
a storage memory; and
a processor configured to execute a series of instructions, the series of instructions, when executed, causing a plurality of memory partitions configured to store digital data to be established in the storage memory, each of the plurality of memory partitions being assigned to a different user of the mobile device based on an identifier associated with the user;
wherein each of the plurality of memory partitions is a subset of the storage memory of the mobile device and wherein the size of a memory partition may grow or shrink in accordance with the amount of digital data that is stored in the memory partition by the assigned user.

32. The mobile device of claim 31, wherein a memory partition is established when a user initiates a use of the mobile device.

33. The mobile device of claim 32, wherein the user initiates a use of the mobile device by performing one of:
providing log-in credentials to the mobile device using a login account; or
connecting an unrecognized smart card to the mobile device.

34. The mobile device of claim 31, wherein the identifier includes one of:
login credentials associated with the user;
an IMSI associated with a smart card of the user;
an ICCID associated with a smart card of the user;
an IM Public User identity associated with a smart card of the user; or
an IP Private User identity associated with a smart card of the user.

35. The mobile device of claim 31, further comprising:
a mapping table configured to maintain mapping information correlating each of the plurality of memory partitions to a corresponding identifier associated with a user.

36. The mobile device of claim 31, wherein the series of instructions, when executed, further cause a user interface to be generated and presented to a user, the user interface configured to enable the user to grant an authorization to another user to access digital data associated with the user.

37. The mobile device of claim 31, further comprising:
a communication component configured to transmit the contents of the plurality of memory partitions to a network storage entity to back-up the plurality of memory partitions.

38. The method of claim 31, wherein the digital data includes one or more of:
a contact list;
a calendar;
a task list;
a note;
a digital media file;
a message; or
a software application.

* * * * *